F. BRIERLEY.
ROLLER BEARING.
APPLICATION FILED JUNE 3, 1919.
1,386,986.
Patented Aug. 9, 1921.
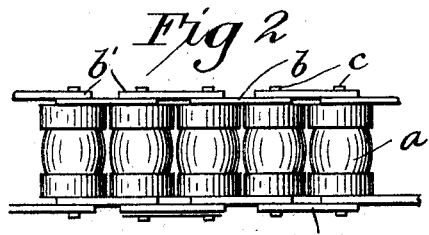
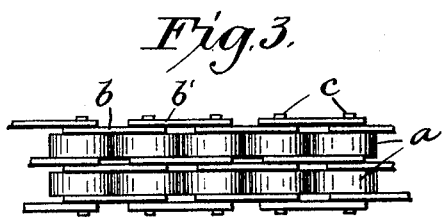
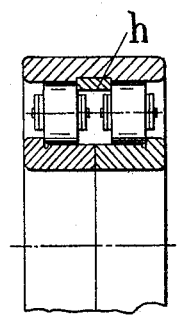
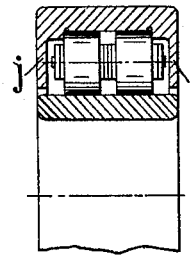
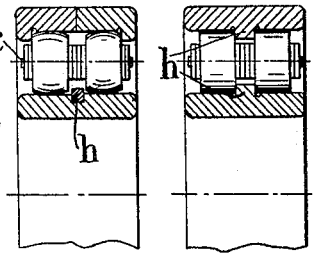
Fig.5.   Fig.6.   Fig.7.   Fig.8.
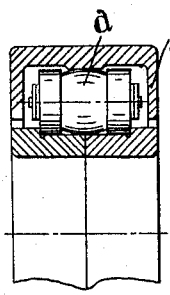
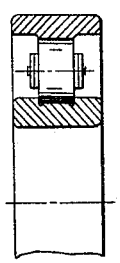
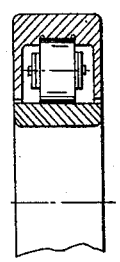
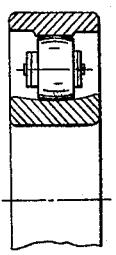
Fig.9.   Fig.10.   Fig.11.   Fig.12.   Fig.13.
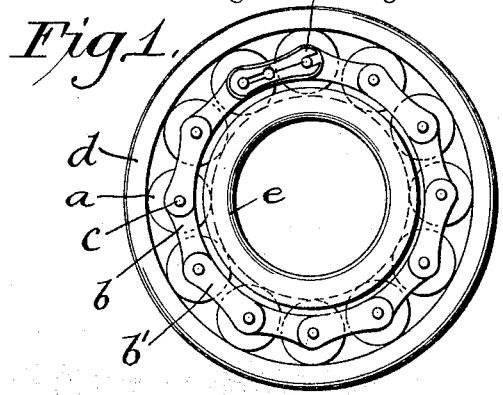
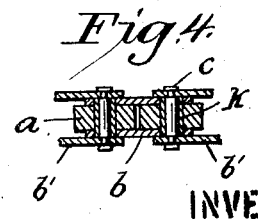
INVENTOR
F. Brierley.
BY H. R. Kerslake
ATTORNEY

UNITED STATES PATENT OFFICE.

FRANK BRIERLEY, OF MANCHESTER, ENGLAND, ASSIGNOR TO CHAIN ROLLER BEARING COMPANY LIMITED, OF STOCKPORT, ENGLAND.

ROLLER-BEARING.

1,386,986.　　　Specification of Letters Patent.　　Patented Aug. 9, 1921.

Application filed June 3, 1919. Serial No. 302,022.

*To all whom it may concern:*

Be it known that I, FRANK BRIERLEY, a subject of the King of Great Britain and Ireland, and resident of the Grand Hotel, Manchester, in the county of Lancaster, England, have invented certain new and useful Improvements in Roller-Bearings, of which the following is a specification.

This invention relates to roller bearings and has for its object to provide an improved arrangement of separating and guiding means for the rollers, which shall permit of the ready assembly and dismantling of the bearings, allow of a maximum number of large diameter rollers being employed, and, due to its elasticity, allow the rollers to move freely when under pressure so as to contact efficiently with the races.

The invention comprises the improved arrangement hereinafter described and claimed, of separating and guiding means for the rollers of roller bearings of the type in which the rollers coöperate with one or both of the races to prevent axial movement of the rollers during the running of the bearing.

Referring to the accompanying explanatory drawings:—

Figure 1 is an end elevation of a roller bearing having roller separating and guiding means constructed in accordance with my invention.

Fig. 2 is a detail view of the rollers with their separating and guiding means removed from the bearing.

Fig. 3 shows a double row of rollers.

Fig. 4 is a sectional view drawn to a larger scale of the inter-connected rollers arranged in one form in accordance with my invention.

Figs. 5 to 13 illustrate various applications of my invention.

In the application of my invention, the rollers $a$ which may be of plain cylindrical form as shown in Fig. 3, or of barrel form (see Figs. 7, 12 and 13) or of combined cylindrical and barrel form, as shown in Fig. 9, are separated and guided by link chains $b, b'$ disposed one at each side of the rollers.

The rollers run on hollow spindles or hubs $k$ (see Fig. 4) through which the ordinary spindles $c$ pass, the chain links $b, b$ connecting the hubs $k$ of two adjacent rollers, and the spindles $c$ of said rollers being connected by chain links $b'$ to the spindles of the next rollers, that is to say, throughout the chain the links connect two hubs and two spindles alternately. This construction gives great rigidity and freedom from twisting. It is essential that the hubs $k$ and the spindles $c$ should be rigidly secured to the links $b$ and $b'$ respectively so that no relative movement between these parts is possible, as such movement would result in twisting of the rollers in the races instead of the rollers being maintained in a ring co-axial with the races.

The chains are provided with readily detachable links held in place by the clips as $f$, Figs. 1 and 2, to allow of the ready insertion and removal of the rollers from the races.

The chains yield freely and allow the rollers to bed upon the races $e$ under all conditions. The rollers may be of any suitable diameter and a maximum number can be employed, the rollers nearly contacting with one another.

I may employ two or more rows of rollers side by side as shown in Fig. 3, the rollers in axial alinement being, if desired, on the same spindle forming a fulcrum of the several chains.

When the two rows of rollers are employed as shown in Figs. 5 to 8, the outer race $d$ may have a spacing ring or collar $h$ between the rows of rollers as in Fig. 5, and the inner race may be divided into two parts: or the outer race may be divided into two parts and the inner race have a spacing ring or collar $h$ as shown in Fig. 7. In Fig. 5, the two rows of rollers are quite independent of one another, while in Fig. 7, the two rows have common spindles as in Fig. 3. The arrangement shown in Fig. 6 comprises extension pieces or sides $j$ upon the outer race which form an oil reservoir at the bottom of the bearing, and provide for the effectual lubrication of the bearing. The chain type of guiding and separating means permits of the assembly of such a bearing which is not possible with rigid types of separators.

In Fig. 8, both the outer and the inner races have spacing rings or collars $h$ thereon, the bearing being assembled by inserting one row of rollers with its chains and projecting roller spindles into place, when the other row of rollers with its chains is threaded on to the spindles.

Fig. 9 shows a combined cylindrical and barrel roller in an oil bath type of outer race.

Fig. 10 shows a single row of rollers running in a groove or recess in the inner race, while Fig. 11 shows the single row of rollers running in a groove in the outer race which is of the oil bath type shown in Figs. 6 and 9.

In Fig. 12, the outer race has a spherical face and in Fig. 13 the inner race has a spherical face to give the bearing self-alining properties.

With my improved arrangements axial movement of the rollers is in every case prevented by the inter-engagement of the rollers and one or both of the races, the chains merely serving as separating and guiding means.

Having now described my invention what I claim as new and desire to secure by Letters Patent is:—

1. In roller bearings, an outer annular ring, a coaxial inner annular ring spaced from the outer ring to provide an annular opening, a row of rollers arranged in the annular opening between said rings and prevented by the rings from axial movement, a bush through each roller, links at opposite sides of the roller rigidly connecting the bushes together in pairs, spindles rotatable in the bushes, links at opposite sides of said rollers rigidly connecting said spindles together in pairs alternating with the first mentioned links, and means for detaching at least one link from the opposite sides of the rollers, as set forth.

2. In roller bearings, an outer ring, a coaxial inner ring spaced from the outer ring to provide an annular opening and having a groove in its outer surface, a row of rollers disposed in said groove and filling the annular opening between the ring, a bush in each roller, links at opposite sides of the rollers rigidly connecting the bushes together in pairs, spindles arranged in said bushes, links at opposite sides of said rollers rigidly connecting said spindles together in pairs alternating with the links aforesaid, and means for detaching at least one link from the opposite sides of the rollers as set forth.

In testimony whereof I have signed my name to this specification.

FRANK BRIERLEY.